United States Patent [19]

Brin et al.

[11] 4,067,316

[45] Jan. 10, 1978

[54] SOLAR ENERGY COLLECTOR

[75] Inventors: Raymond L. Brin, Cedar Crest; Thomas L. Pace, Albuquerque, both of N. Mex.

[73] Assignee: The United States of America as represented by the United States Department of Energy, Washington, D.C.

[21] Appl. No.: 734,839

[22] Filed: Oct. 22, 1976

[51] Int. Cl.² .................................. F24J 3/02
[52] U.S. Cl. ........................... 126/271; 126/270
[58] Field of Search ............. 126/271, 270; 237/1 A; 165/48, 18, DIG. 11

[56] References Cited

U.S. PATENT DOCUMENTS

| | | | |
|---|---|---|---|
| 2,998,005 | 8/1961 | Johnston | 126/270 |
| 3,102,532 | 9/1963 | Shoemaker | 126/270 |
| 3,254,702 | 6/1966 | Thomason | 165/48 |
| 3,875,925 | 4/1975 | Johnston | 126/270 |
| 3,981,294 | 9/1976 | Deminet et al. | 126/271 |
| 3,996,918 | 12/1976 | Quick | 126/270 |

Primary Examiner—Kenneth W. Sprague
Assistant Examiner—James C. Yeung
Attorney, Agent, or Firm—Dean E. Carlson; Dudley W. King; Robert Southworth

[57] ABSTRACT

The invention relates to a solar energy collector comprising solar energy absorbing material within chamber having a transparent wall, solar energy being transmitted through the transparent wall, and efficiently absorbed by the absorbing material, for transfer to a heat transfer fluid. The solar energy absorbing material, of generally foraminous nature, absorbs and transmits the solar energy with improved efficiency.

1 Claim, 8 Drawing Figures

SOLAR ENERGY COLLECTOR

FIELD OF THE INVENTION

The invention relates to solar energy and more particularly to what may be referred to as "flat plate solar energy collectors" used for a source of heat.

BACKGROUND OF THE INVENTION

Two general categories of solar energy collectors are known; the flat plate collector and the concentrating collector. For end uses of heat that require a relatively low temperature, such as space heating and domestic hot water heating, the flat plate collector is preferred because of its relatively cheaper construction and because it utilizes both direct and scattered solar radiation.

The general configuration of a flat plate collector is a shallow box with transparent wall or surface for passage of solar radiation to interior of the box, where it may be absorbed by an absorber plate and then transferred to a fluid such as air or water by convection or conduction.

The transparent wall or surface may be composed of one or more sheets of glass or plastic. This increases the efficiency of the collector by reducing convective and conductive heat losses as well as reducing radiative heat losses. This is true because whereas they are transparent to visible light, glass and, to a lesser extent, plastic are considered to be opaque to the longer wavelengths re-emitted by an absorber plate or the like within the box.

One of the problems in designing the absorber for a flat plate collector is to find a material that will absorb a large proportion of the energy contained in the incident light, efficiently transfer that energy to the fluid, and remain low in cost. A desirable collector is one with a high absorption coefficient, direct contact between the absorber and the fluid, turbulent flow of the fluid over the absorber, and a large contact surface between the absorber and the fluid.

Absorbers have been designed which include a black flat or corrugated surface, a flat plate with heat conducting fins, a flat plate with cup-like objects attached, or layers of blackened cloth.

OBJECTS OF THE INVENTION

The present invention has for its primary object the provision of a new and improved apparatus for collecting and transmitting solar energy.

It is another object of the present invention to provide a more efficient solar energy absorbing material.

It is another object of the present invention to provide a low cost solar energy absorbing material.

It is another object of the present invention to provide a solar energy absorbing material that may employ what would normally be considered waste material.

It is another object of the present invention to provide a new and improved solar heating system.

BRIEF DESCRIPTION OF THE DRAWINGS

Other objects and advantages of the present invention will be apparent to those skilled in the art from the following description with reference to the appended claims wherein like numbers denote like parts and wherein:

DETAILED DESCRIPTION OF THE INVENTION

Figure 1:
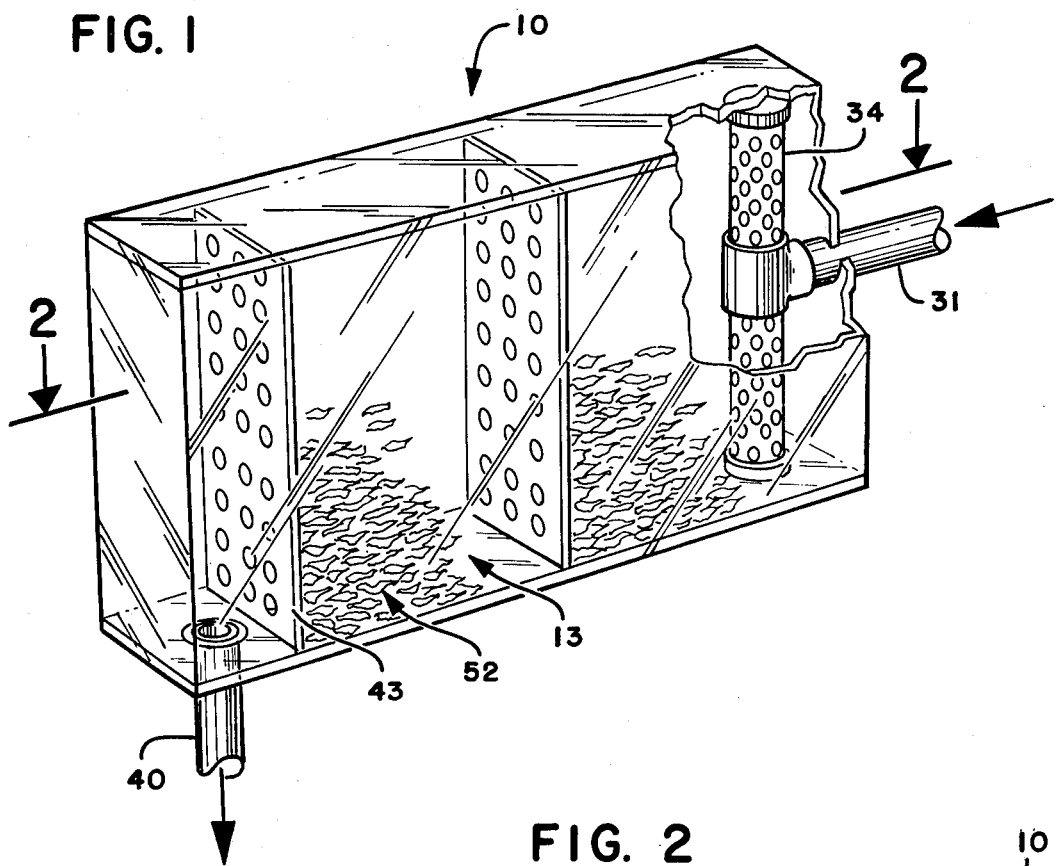
FIG. 1 is a perspective view of a solar energy collector in accordance with the invention.
Figure 2:
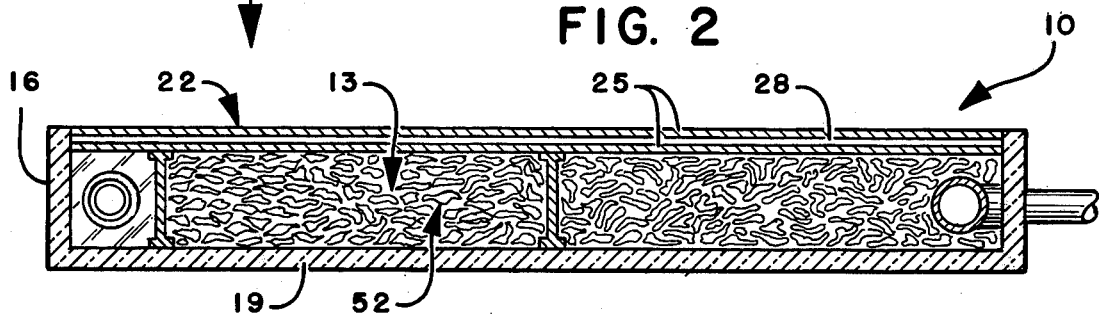
FIG. 2 is a cross section of the solar energy collector taken along line 2—2 of FIG. 1.

As shown in FIGS. 1 and 2, the solar energy collecting device 10 comprises interior chamber 13 with side walls 16 with inlet passageway 31 and outlet passageway 40, a bottom wall 19 and a top wall 22. The side walls 16 and bottom wall 19 may be a rigid plastic foam, plywood, or other such rigid, insulating material as may be desired by those skilled in the art.

The top wall 22 is preferably comprised of one or more transparent sheets 25 spaced apart in a manner defining an insulating gap 28. The transparent sheets 25 are of glass, plastic, or other such essentially transparent material. Within insulating gap 28 may be air, a vacuum, some other gas, or other such insulating substance.

The interior chamber 13 is at least partially filled with energy absorbing material 52, comprised of a matrix or mass of heterogeneously disposed and closely intertwined elongate members in the form of filaments or tendrils. This material has the characteristics of a high ratio or surface area to mass, a high ratio of void volume to occupied volume, high absorbtivity for solar energy, and low pressure drop for passage of heat transfer fluid. Such a material may be painted or anodized lathe turnings, blackened or darkened wool-like material, shredded light-absorbent sheet, or other like materials. Preferred materials are of relatively high density and thermal conductivity such as afforded by metals such as aluminum, copper, iron or the like.

The solar energy absorbing material 52 occupies a space intermediate inlet passageway 31 and outlet passageway 40 such that heat transfer fluid passing from the inlet passageway to the outlet passageway must pass through the interstices of the solar energy absorbing material 52. The inlet and outlet passageways preferably connect within inlet distributor 34 and outlet collector 43 which may be a perforate pipe, perforate plenum, or the like.

The heat transfer fluid may be a gas such as air or a liquid such as water or any like suitable substance which is flowable through the foraminous solar energy absorbing material 52 efficiently picking up heat energy from said solar energy absorbing material, and carrying said heat energy to a desired more remote location.

Figure 3:
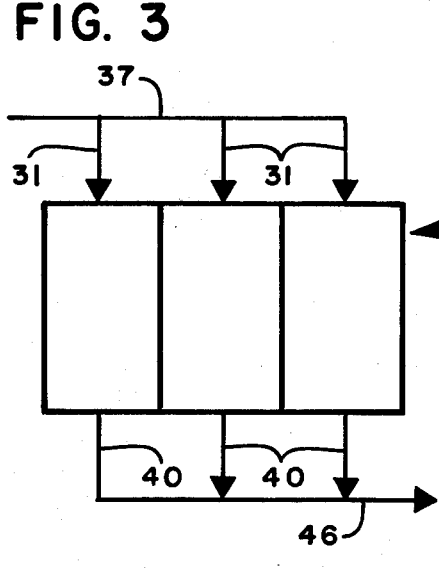
FIG. 3 shows more or less schematically a plurality of the collectors connected in parallel.
Figure 4:
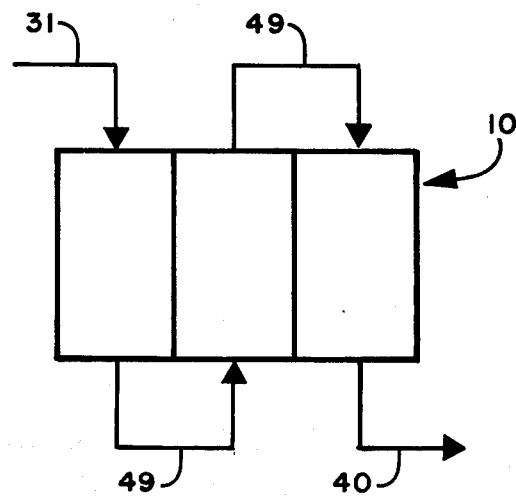
FIG. 4 shows more or less schematically a plurality of the collectors connected in series.

As shown in FIG. 3, several solar energy absorber 10 may be connected in a parallel arrangement such that individual inlet passageways 31 are connected to a common inlet manifold 37 and their individual outlet passageways are connected to a common outlet manifold 46. Alternatively (FIG. 4) several solar energy absorbers 10 may be connected in a series arrangement such that the outlet passageway of one collector is connected to the inlet passageway of another collector to form a joint passageway 49. Such arrangements as shown in FIG. 3 and FIG. 4 may be used depending on the intended use of this invention. Other similar arrangements will be obvious to those skilled in the art.

Figure 5:
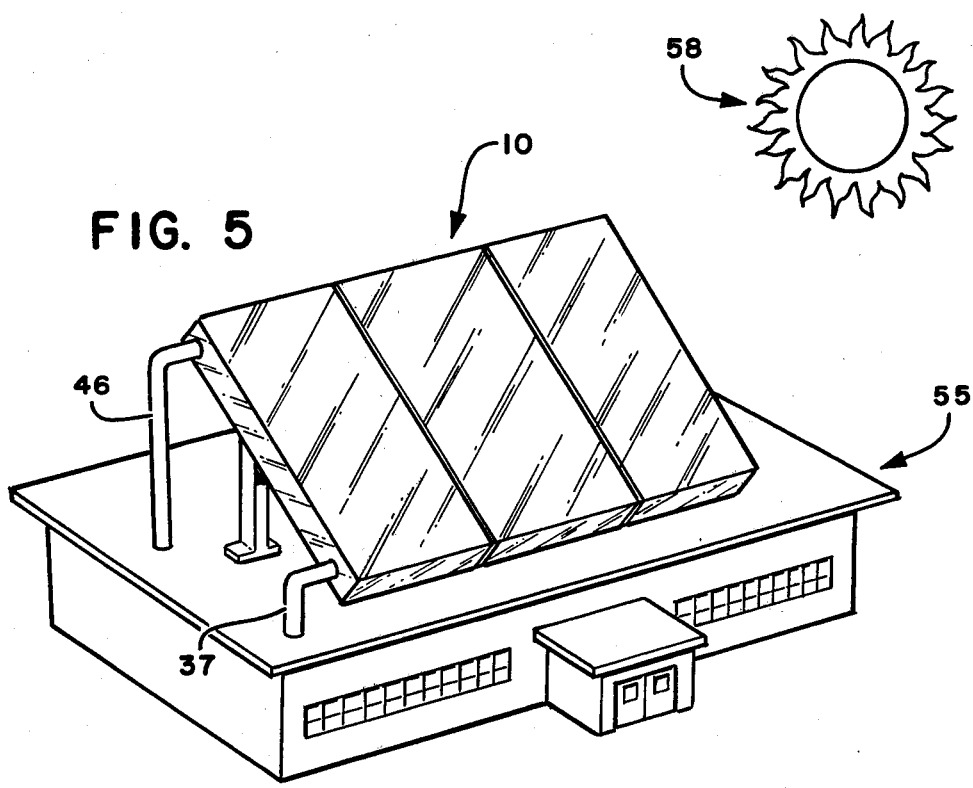
FIG. 5 shows an embodiment of the present device as it may be employed in a building.

FIG. 5 illustrates the employment of the invention to heat the interior of a structure or building. Several solar energy collectors 10 are mounted on the roof of a structure 55 and are positioned so as to intercept the rays of the sun 58. It is not necessary for the practice of the invention that the collectors be roof mounted. They may be mounted in the wall of the structure or mounted independently from the structure. The mounting may be of a fixed orientation or may be adjustable so as to intercept the optimum amount of solar energy throughout the day or throughout the year. Connecting the solar energy collectors 10 and the interior space of the structure are inlet manifold 37 and outlet manifold 46.

In operation, diffuse or direct sunlight strikes the transparent top wall 22 of the solar energy collecting device 10 and is transmitted to the interior chamber 13 where it strikes the surface of the solar energy absorbing material 52, thereby raising its temperature. It is well known in the art that such light, once absorbed, may be re-emitted in longer wavelength energies. Such longer wavelengths are trapped by the transparent top wall which is generally opaque to energies of this longer wavelength. Heat transfer fluid passing from the interior space of the structure 55 through said inlet manifold 37 is warmed as it passes through the solar energy absorbing material 52 and then passes back into the interior of said structure through outlet manifold 46.

Figure 6:
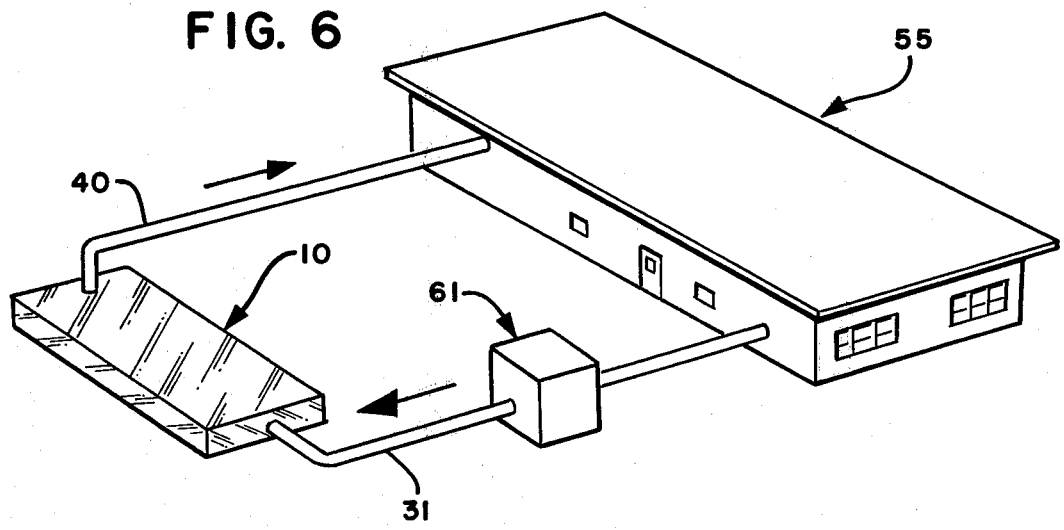
FIGS. 6, 7 and 8 show generally schematically additional arrangements of the invention.

FIG. 6 shows schematically, the relationship between the solar collector 10 and the structure 55 wherein the circulation of the heat transfer fluid through passageways 31 and 40 is caused by a pumping device 61, and wherein the heat transfer fluid is also the fluid that occupies the interior space within said structure. The location and number of said pumping devices may be chosen as appropriate to the particular system. Through proper placement of the solar energy collector, circulating of the heat transfer fluid will be established through natural convection.

Figure 7:
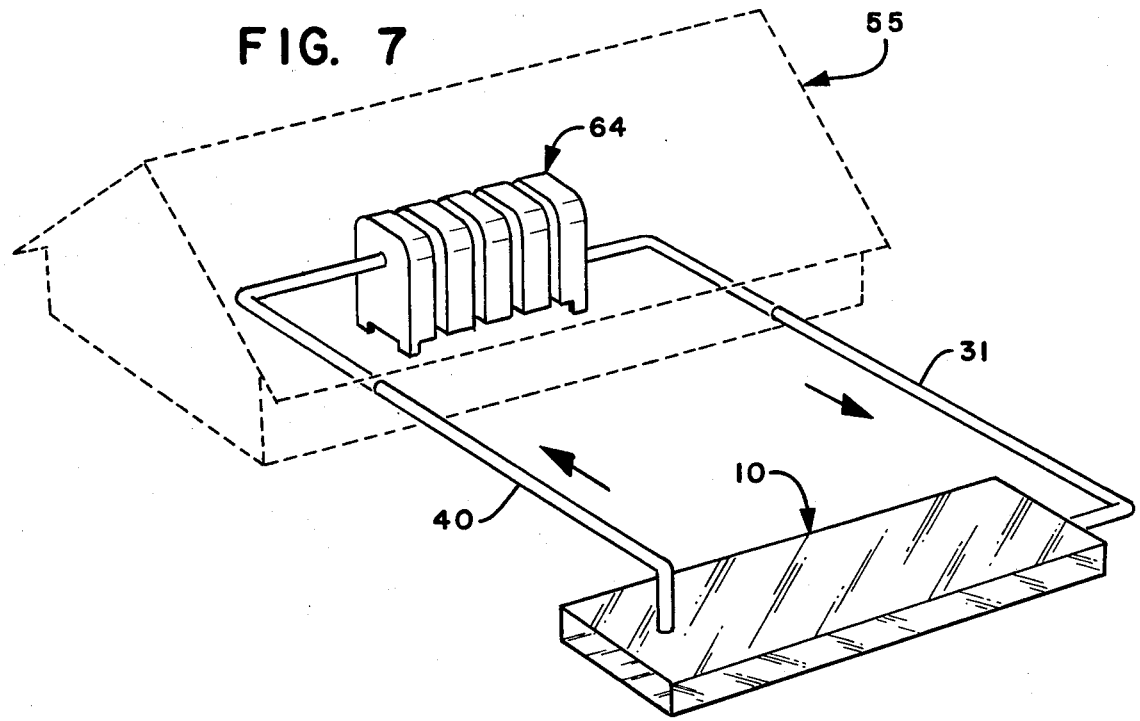

FIG. 7 shows schematically the relationship between the solar energy collector 10, the structure 55, the inlet passageway 31, and the outlet passageway 40 wherein the heat transfer fluid passes through a heat exchanger 64 and is not in direct communication with the interior space of said structure.

Figure 8:
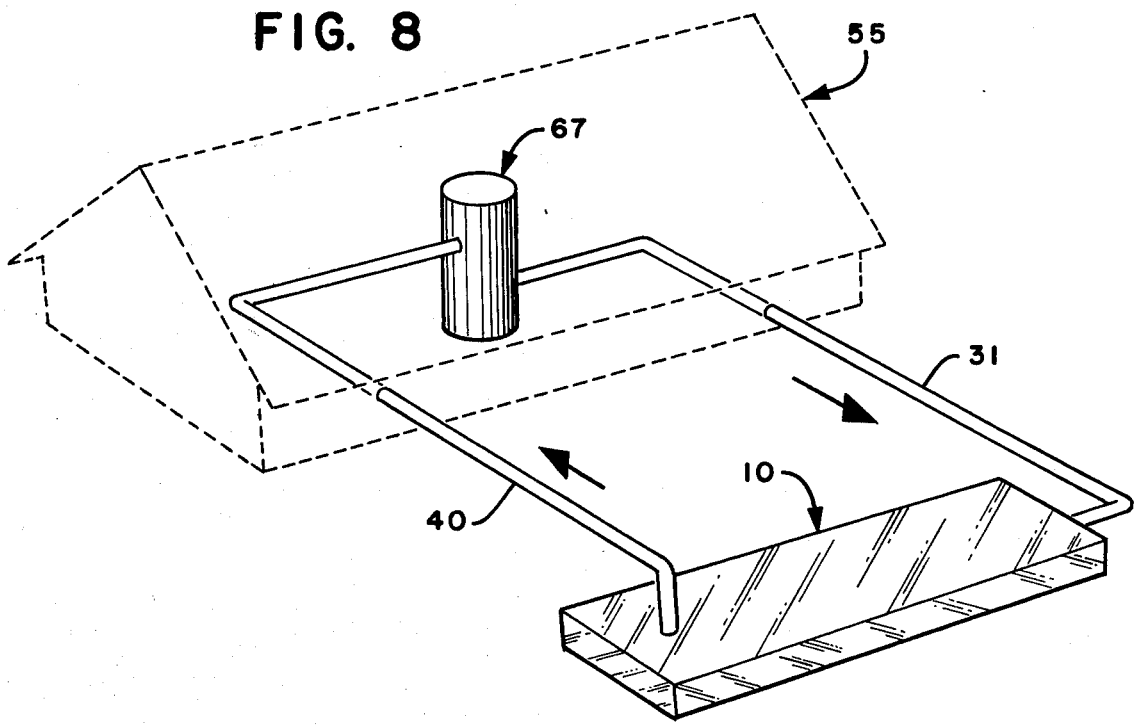

FIG. 8 shows schematically the relationship between the solar energy collector 10, the structure 55, the inlet passageway 31, and the outlet passageway 40, wherein the heat transfer fluid passes through a heat storage unit 67. The heat collecting efficiency of the solar energy collector may be further increased by blackening the interior surfaces of the bottom and side walls and by so positioning appropriate mirrors or reflection surfaces as to increase the amount of solar rays intercepted by the solar energy collector.

In one solar energy collecting device 10 as illustrated in FIG. 1 the bottom and side walls were of 1 inch rigid polyurethane sheet, the top transparent wall was of polycarbonate plastic sheet, the air diffuser was of 3 inch perforated PVC pipe, the heat absorbing material was scrap aluminum lathe turnings painted black, and the overall dimensions were 6 inches high, 4 feet wide, and 8 feet long. Air flowing through the unit at about 56 cubic feet per minute was heated to 155° F without the blackened aluminum lathe turnings in place and 187° F with the blackened aluminum lathe turnings in place under the same incident solar radiation conditions.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A solar energy collecting device comprising a rectangular container having top, bottom, and side walls with said top wall being transparent for transmission of solar rays to the interior of said container, an inlet passageway to said container extending through one of said side walls, a perforate diffuser conduit connected with said inlet passageway and extending across the interior of said device substantially from one side wall to an opposite side wall for distributing incoming fluid substantially uniformly throughout a cross section of said container, and a heat transferring matrix, an outlet passageway spaced from said inlet passageway and extending through a side wall adjacent an end of the device opposite said inlet passageway and diffuser, a matrix of heterogeneously and closely intertwined solar energy absorbing blackened metallic lathe turnings adjacent said transparent wall filling a major portion of the space intermediate said passageways and substantially enclosing said diffuser conduit, all fluid passing from said inlet passageway and diffuser conduit to said outlet passageway flowing lengthwise through said matrix for receiving heat from the blackened metallic lathe turnings and elevating the temperature of said fluid.

* * * * *